(12) United States Patent
Tan

(10) Patent No.: US 8,504,772 B2
(45) Date of Patent: Aug. 6, 2013

(54) METHOD AND APPARATUS FOR WIRELESS DIGITAL CONTENT MANAGEMENT

(75) Inventor: Wayne Joon Yong Tan, Singapore (SG)

(73) Assignee: T-Data Systems (S) Pte Ltd, Singapore (SG)

( * ) Notice: Subject to any disclaimer, the term of this patent is extended or adjusted under 35 U.S.C. 154(b) by 46 days.

(21) Appl. No.: 12/863,556

(22) PCT Filed: Sep. 4, 2008

(86) PCT No.: PCT/SG2008/000327
§ 371 (c)(1),
(2), (4) Date: Jul. 19, 2010

(87) PCT Pub. No.: WO2010/027327
PCT Pub. Date: Mar. 11, 2010

(65) Prior Publication Data
US 2011/0145464 A1    Jun. 16, 2011

(51) Int. Cl.
*G06F 12/00* (2006.01)
(52) U.S. Cl.
USPC .......................................... 711/115; 710/313
(58) Field of Classification Search
USPC .......................................... 711/115; 710/313
See application file for complete search history.

(56) References Cited

U.S. PATENT DOCUMENTS

| | | | |
|---|---|---|---|
| 6,055,442 A | 4/2000 | Dietrich | |
| 6,296,191 B1 | 10/2001 | Hamann et al. | |
| 8,176,230 B2 * | 5/2012 | Chen et al. | 711/103 |
| 2002/0052219 A1 | 5/2002 | Hamamura | |
| 2002/0174337 A1 | 11/2002 | Aihara | |
| 2003/0079096 A1 | 4/2003 | Murakami | |
| 2003/0128272 A1 | 7/2003 | Clough et al. | |
| 2003/0135731 A1 | 7/2003 | Barkan et al. | |
| 2004/0127254 A1 | 7/2004 | Chang | |
| 2004/0219949 A1 | 11/2004 | Su et al. | |
| 2004/0250037 A1 | 12/2004 | Takemura et al. | |
| 2005/0021983 A1 | 1/2005 | Arnouse | |
| 2005/0156737 A1 | 7/2005 | Al-Khateeb | |
| 2005/0166077 A1 | 7/2005 | Reisacher | |
| 2006/0000914 A1 | 1/2006 | Chen | |

(Continued)

FOREIGN PATENT DOCUMENTS

| | | | |
|---|---|---|---|
| CN | 1770768 A | | 5/2006 |
| CN | 101110656 A | | 1/2008 |

(Continued)

OTHER PUBLICATIONS

"Eye-Fi Unveils World's First Wireless Memory Card" Press Release; Eye-Fi, Inc.; Mountain View, CA; Oct. 30, 2007.*

(Continued)

*Primary Examiner* — Glenn A Auve
(74) *Attorney, Agent, or Firm* — Foley & Lardner LLP

(57) ABSTRACT

A memory card to be used in an apparatus having an inbuilt processor incapable of independently exporting digital data externally of the apparatus, the digital data being captured by the apparatus, the memory card comprising a central processor configured to control the export of data from the apparatus, a storage module operably connected to the central processor and being configured to store the data to be exported, and a wireless module configured to export the digital data from the storage module and being operably connected to one of: the central processor, and the memory. A corresponding method is also disclosed.

22 Claims, 4 Drawing Sheets

U.S. PATENT DOCUMENTS

| | | | |
|---|---|---|---|
| 2006/0039221 A1 | 2/2006 | Fukuda | |
| 2006/0056326 A1 | 3/2006 | Croome | |
| 2006/0246840 A1 | 11/2006 | Borowski et al. | |
| 2006/0258389 A1 | 11/2006 | Saito et al. | |
| 2007/0015589 A1 | 1/2007 | Shimizu et al. | |
| 2007/0030357 A1 | 2/2007 | Levien et al. | |
| 2007/0073937 A1 | 3/2007 | Feinberg et al. | |
| 2007/0242822 A1 | 10/2007 | Hamada | |
| 2008/0102766 A1 | 5/2008 | Schultz | |
| 2008/0195797 A1 | 8/2008 | Sherman et al. | |
| 2008/0233870 A1* | 9/2008 | Budde | 455/41.2 |
| 2009/0193514 A1 | 7/2009 | Adams et al. | |
| 2009/0256684 A1* | 10/2009 | Fukuda | 340/10.3 |
| 2010/0115200 A1 | 5/2010 | Papagrigoriou | |
| 2010/0201845 A1 | 8/2010 | Feinberg et al. | |
| 2011/0004840 A1 | 1/2011 | Feinberg et al. | |
| 2011/0025858 A1 | 2/2011 | Elazar et al. | |
| 2011/0145464 A1 | 6/2011 | Tan | |
| 2011/0314068 A1* | 12/2011 | Sherman et al. | 707/824 |
| 2012/0242845 A1 | 9/2012 | Tan | |

FOREIGN PATENT DOCUMENTS

| | | |
|---|---|---|
| EP | 1 875 757 B1 | 1/2008 |
| JP | 2002-009690 A | 1/2002 |
| JP | 2004-310557 A | 11/2004 |
| JP | 2005-252552 A | 9/2005 |
| JP | 2005-323220 A | 11/2005 |
| JP | 2006-041873 A | 2/2006 |
| JP | 2006-113719 A | 4/2006 |
| JP | 2006-128892 A | 5/2006 |
| JP | 2006-245748 A | 9/2006 |
| JP | 2007-288254 A | 11/2007 |
| KR | 10200569914 | 7/2005 |
| TW | 200828124 | 12/1995 |
| TW | 200828124 A | 7/2008 |
| WO | WO-2006/117009 A1 | 11/2006 |

OTHER PUBLICATIONS

"The Guide to Digital Photography with the D80 Digital Camera"; Nikon Corportation; Tokyo, Japan.*

User's Manual—D80—Guide to Digital Photography; website URL: <http://support.nikonusa.com/app/answers/detail/a_id/14051>; published Aug. 11, 2006.*

Nikon D80 Wikipedia Entry, accessed at URL <http://en.wikipedia.org/wiki/Nikon_D80> on Feb. 4, 2013.*

International Preliminary Report on Patentability dated Dec. 23, 2010 as received in corresponding PCT Application No. PCT/SG2009/000279, 7 pages.

International Search Report and Written Opinion dated Oct. 20, 2009 as received in corresponding PCT Application No. PCT/SG2009/000279, 9 pages.

United Kingdom Examination Report dated Mar. 5, 2012 as received in corresponding United Kingdom Application No. GB1005503.6, 2 pages.

International Search Report corresponding to PCT/SG2008/000327, dated Nov. 13, 2008, 2 pages.

International Preliminary Report on Patentability corresponding to PCT/SG2008/000327, dated Jul. 13, 2009, 7 pages.

PCT Written Opinion corresponding to PCT/SG2008/000327, dated Nov. 13, 2008, 5 pages.

PCT Written Opinion corresponding to PCT/SG2008/000327, dated Apr. 30, 2009, 6 pages.

Chinese First Office Action dated Jul. 26, 2011 as received in corresponding Chinese Application No. 200980100887.9, 5 pages.

Chinese Notification of First Office Action dated Mar. 27, 2012 as received in corresponding Chinese Application No. 200980100916.1, 19 pages.

English translation of Korean Office Action dated Jan. 18, 2012 as received in corresponding Korean Patent Application No. 10-2010-7009130, 5 pages.

European Extended Search Report dated Dec. 9, 2011 as received in corresponding European Application No. 09811782.3, 8 pages.

http://photojojo.com/store/awesomeness/eye-fi-wifi-memory; "Eye-Fi Gives Any Camera Wi-Fi and Geo-Location"; Eye-Fi Wireless Camera SD Memory at The Photojojo Store, 4 pages.

International Preliminary Examination Report received in corresponding PCT Application No. PCT/SG2009/000280, dated Mar. 17, 2011, 7 pages.

International Search Report and Written Opinion as received in PCT/SG2009/000280 dated Oct. 26, 2009, 7 pages.

Japanese First Office Action dated Apr. 20, 2012 as received in corresponding Japanese Application No. 2010-530964, 4 pages.

English translation of a Japanese Office Action received in connection with Japanese application No. 2010-530964; dtd Jan. 31, 2013.

English translation of Japanese First Office Action dated Jul. 10, 2012 as received in corresponding Japan Application No. 2010-530967.

Extended European Search Report received in connection with European appplication No. 08794229.8; dtd Aug. 29, 2012.

Koichi Sakurai (translation supervisor), "Basis of Cryptographic Theory", Kyoritsu Shuppan Co., Ltd., Nov. 1, 1996, 1st ed., pp. 290-293.

Korean office action received in connection with Korean application No. 10-2010-7009130; dtd Oct. 22, 2012.

US Office Action dated Sep. 21, 2012 as received in corresponding U.S. Appl. No. 12/863,547.

US Office Action on received in connection with U.S. Appl. No. 12/863,554; DTD Mar. 14, 2013.

* cited by examiner

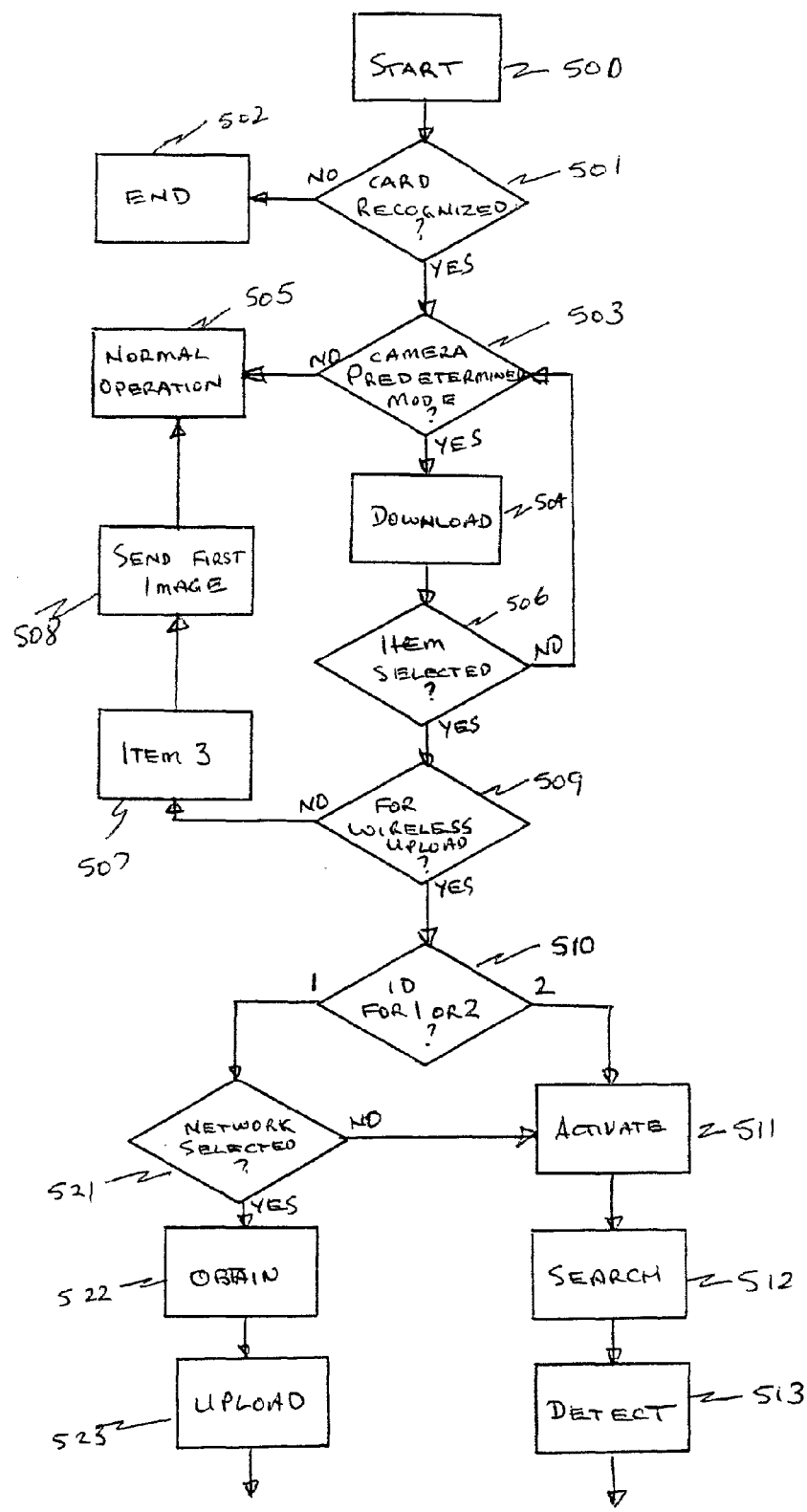
FIG. 5 (FIRST PART)

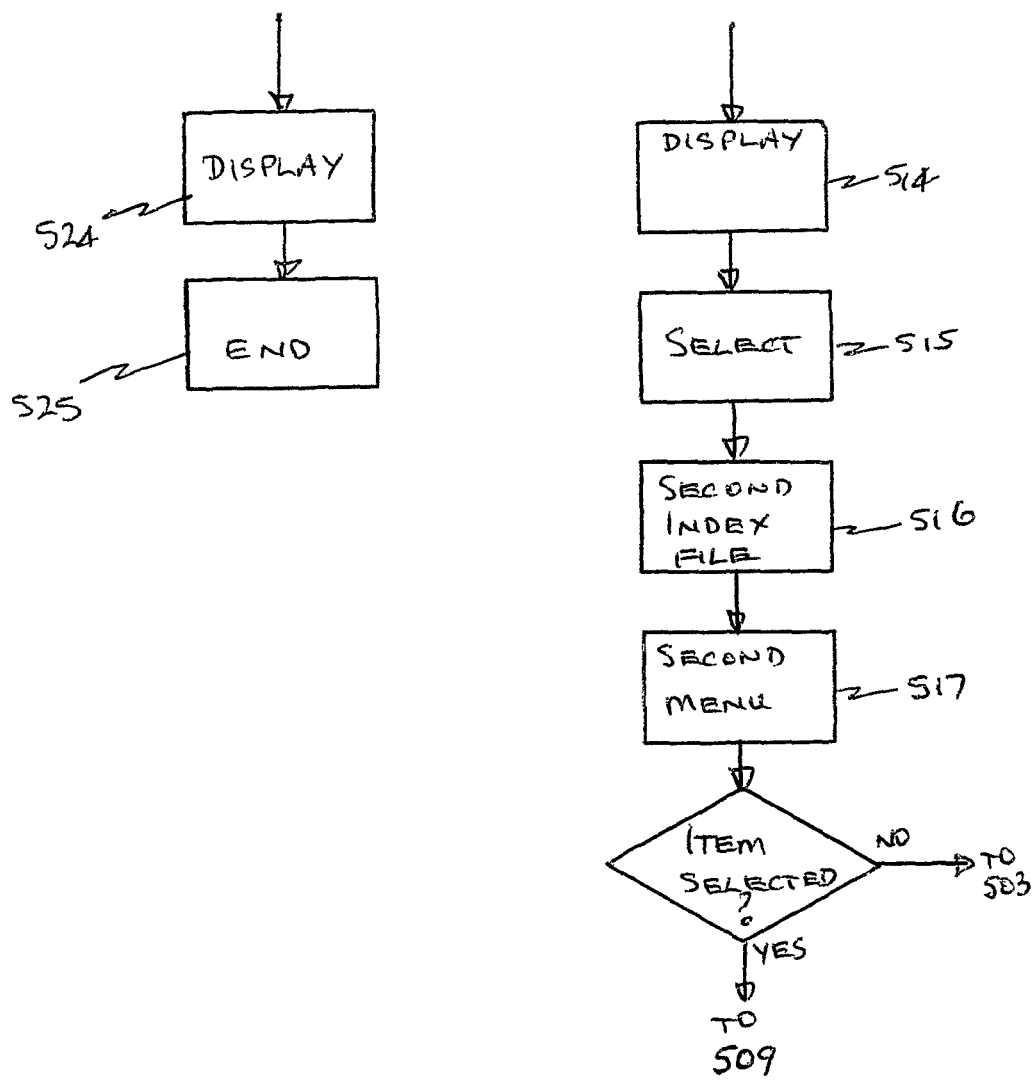
FIG. 5 (FINAL PART)

METHOD AND APPARATUS FOR WIRELESS DIGITAL CONTENT MANAGEMENT

CROSS-REFERENCE TO RELATED APPLICATIONS

This is a National Stage application of PCT/SG2008/000327, filed Sep. 4, 2008. The foregoing application is incorporated by reference herein in its entirety.

TECHNICAL FIELD

This invention relates to a method and apparatus for wireless digital content management and refers particularly, though not exclusively, to such a method and apparatus using a wireless media for enabling apparatus to communicate wirelessly.

BACKGROUND

Many portable electronic devices such as, for example, digital cameras, digital video cameras, digital voice recorders, digital diaries, personal digital assistants, digital organisers, digital media players, and MP3 players, must be physically and electrically connected to a host computer to enable downloads and uploads of digital content. The digital content may be, for example, images, video images, marketing material, music content, and so forth. The application to manage and control uploads and downloads resides in the host computer. This is not always convenient.

This is because the electronic device has a processor that is incapable of independently exporting digital data captured by the apparatus. The portable apparatus requires a connection with the host computer to and the host computer imports the digital data captured by the apparatus, and the host computer exports digital data from the host computer to the electronic device. For all relevant functions the host computer controls the process. For example, a digital camera (still or video) will normally require a connection to a host computer for digital data captured by the digital camera to be uploaded to the computer. Alternatively, a memory card or similar non-volatile memory of the digital camera may be removed and inserted into the host computer for the digital data stored in the memory card to be uploaded to the host computer. Once stored in the host computer's memory, the digital data can be uploaded to a web site. For example, there are many web sites allowing the storing of personal photographs—"FaceBook" and "U-Tube" being but two of many examples. This requires access to a host computer for uploading to take place. This may not always be convenient.

SUMMARY

According to an exemplary aspect there is provided a memory card to be used in an apparatus having an inbuilt processor incapable of independently exporting digital data externally of the apparatus, the digital data being captured by the apparatus, the memory card comprising a central processor configured to control the export of data from the apparatus, a storage module operably connected to the central processor and being configured to store the data to be exported, and a wireless module configured to export the digital data from the storage module and being operably connected to one of: the central processor, and the memory.

The memory card may be configured to physically and operatively engage in and with the apparatus, and to operatively connect with the inbuilt processor; the operative connection being in the same manner as, and the inbuilt processor sees the memory card as, a normal memory card. At least one control button of the apparatus may be able to be used to control the central processor when the memory card physically and operably engages in and with the apparatus is in a predefined mode. The exporting of the digital data may take place only when the apparatus is in the predefined mode. When the apparatus is in the predefined mode, the central processor may be configured to send a first index image file to the inbuilt processor for display of the first index image file on a screen of the apparatus, the first image index file comprising a plurality of first menu items, each of the plurality of first menu items comprising an image. The first menu item selected may determine if the inbuilt processor is to be used to process the digital data, or if the processor and the wireless module are to be used to wirelessly export the digital data from the memory card. The digital data may be selected from: image data, audio data, image and audio data, video data, and audio and video data. The memory card may comprise at least one address to which the processor and the wireless interface are to send the digital data. The apparatus may be selected from: a digital camera, a digital video camera, a digital voice recorder, and a digital diary.

According to another exemplary aspect there is provided a method for exporting data from an apparatus having an inbuilt processor incapable of independently exporting digital data externally of the apparatus, the method comprising:

selecting a predetermined mode of the apparatus;

sending a first index image file to the apparatus from a memory card installed in and operatively connected to the apparatus, the memory card having a central processor, a storage module and a wireless module, the first index image file comprising a plurality of first menu items with each of the first menu items comprising an image, the storage module having stored therein digital data;

using control buttons of the apparatus to select one menu item from the first menu items;

the one menu item selected determining if the inbuilt processor is to be used to process the digital data, or if the central processor and the wireless module are to be used to wirelessly export the digital data from the memory card.

According to a further exemplary aspect there is provided a method for exporting data from an apparatus having an inbuilt processor incapable of independently exporting data externally of the apparatus, the method comprising:

capturing digital data using the apparatus and storing the digital data in a memory card installed in and operatively connected to the apparatus, the memory card having a central processor, a memory module and a wireless module;

selecting a predetermined mode of the apparatus;

the central processor sending a first index image file to the apparatus from the memory card, the first index image file comprising a plurality of first menu items;

using control buttons of the apparatus to select one menu item from the plurality of first menu items;

upon an appropriate menu item being selected, the central processor and the wireless module wirelessly export the digital data from the memory card.

Upon an appropriate menu item being selected, the central processor and the wireless module may wirelessly export the digital data from the memory card. The memory card may physically and operatively engage in and with the apparatus; the memory card operatively connects with the inbuilt processor in the same manner as, and the inbuilt processor sees the memory card as, a normal memory card. The control buttons of the apparatus may be able to be used to control the central processor only when the apparatus is in the predefined mode. The exporting of the digital data may take place only when the apparatus is in the predefined mode. The first index image file may be displayed on a screen of the apparatus. The digital data may be selected from: image data, audio data, image and audio data, video data, and audio and video data. The digital data may be exported to at least one Internet address stored in the memory. The apparatus may be selected from: a digital camera, a digital video camera, a digital voice recorder, and a digital diary. Upon the control buttons being used to select the one menu item of the first menu items, the inbuilt processor may send an instruction to the central processor, the instruction containing an identifier of the one menu items. When the apparatus is in the predetermined mode and the one menu item is relevant for the wireless export of the digital data from the memory card, the central processor may treat the instruction as "select". The instruction may be "delete".

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings:

FIG. 5 is a flow chart for the operation of the exemplary embodiment of FIGS. 1 to 4.

DETAILED DESCRIPTION OF THE EXEMPLARY EMBODIMENTS

The exemplary embodiment is a method and apparatus to manage digital content for portable apparatus 100 via a wireless media. The portable apparatus 100 may be a digital camera, digital video camera, digital voice recorder, or digital diary. As shown, it is a digital camera. The digital camera 100 has a slot 102 into which a memory card 200 is inserted in the usual manner.

Figure 1:
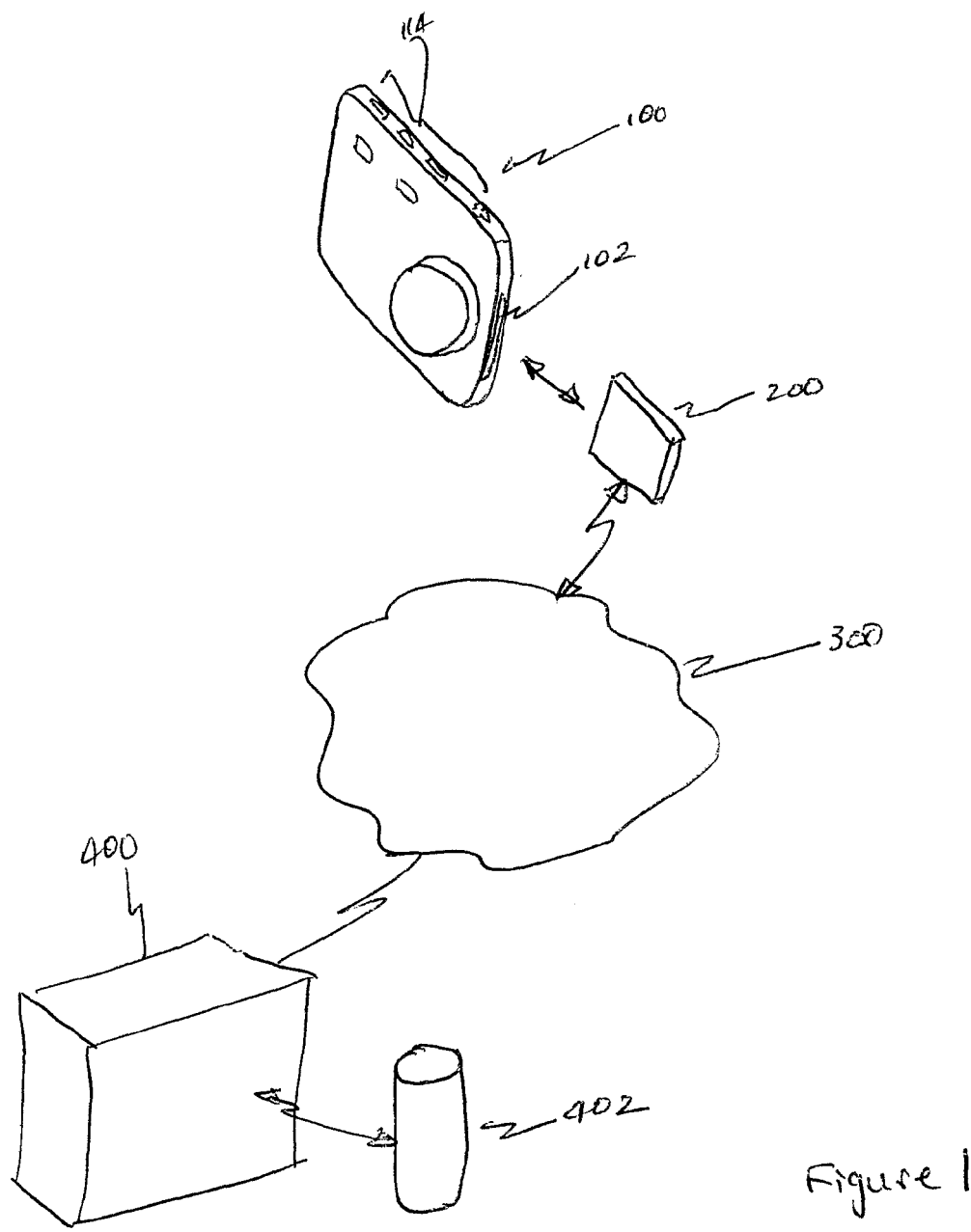
FIG. 1 is a schematic view of an exemplary system of a wireless media connectable to a host device to enable data captured from the host device to be transferred to a server wirelessly.
Figure 2:
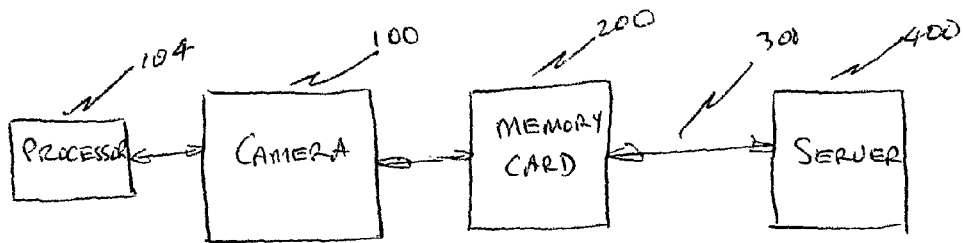
FIG. 2 is a block diagram illustrating the exemplary system of FIG. 1.
Figure 3:
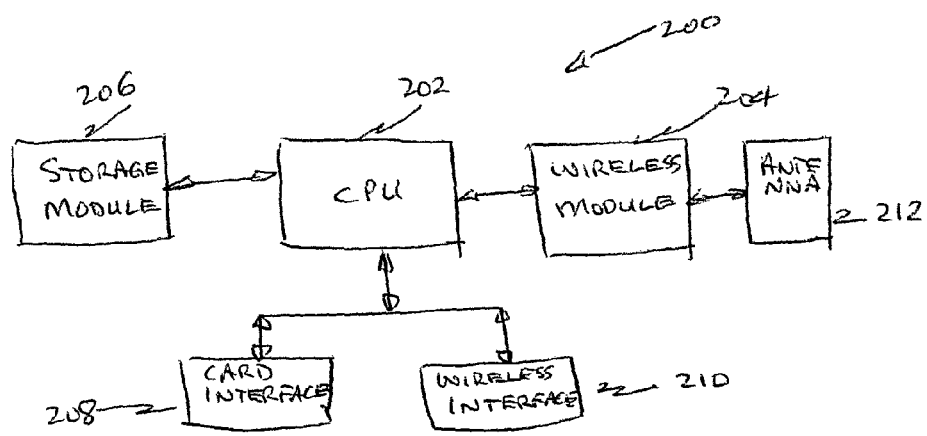
FIG. 3 is an illustration of the wireless media of FIG. 1.
Figure 4:
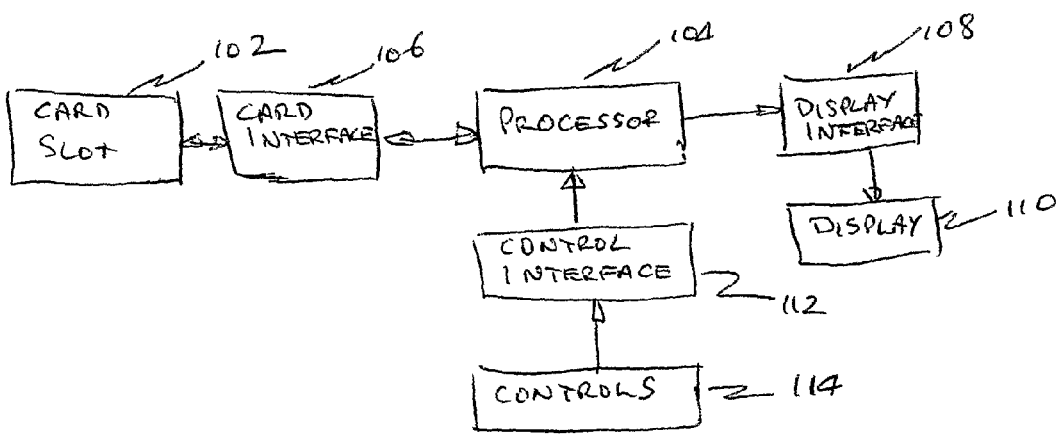
FIG. 4 is an illustration of the processor of the host device of FIG. 1.

The memory card 200 is shown in FIG. 3 and has a central processor 202, a wireless module 204 operatively connected to the central processor 202, and a storage module 206 operatively connected to the central processor 202. The central processor 202 has a card interface 208 as well as a wireless interface 210. The wireless module 204 also has an antenna 212.

The digital camera 100 has an inbuilt processor 104 with a card interface 106 for interfacing with the memory card 200 when inserted into slot 102. The inbuilt processor 104 also has a display interface 108 for controlling the display screen 110 of the camera 100. Furthermore, the inbuilt processor 104 has a control interface 112 for enabling the camera control buttons and so forth 114 to be used to control the operation of the camera 100. The inbuilt processor 104 is incapable of independently exporting digital data externally of the camera 100. By independently exporting it is meant that the processor 104 requires the camera 100 to be operatively connected to an intelligent host such as a computer that has the relevant operative software to enable the export of the data to the computer from the camera, the exporting being under the control of the computer. The normal operation of the camera 100 is under the control of the inbuilt processor 104.

Due to the card interface 208, whenever memory card 200 is engaged in the slot 102 of the camera 100 (500), the card interface 106 sees the memory card 200 as a normal memory card and will interface with it in the usual manner for transferring image and/or audio data from the inbuilt processor 104 to the memory card 200 (501). If the card 200 is not of a category recognised by the camera 100, it will display an error message in the normal manner and the process ends (502).

Once the initial connection between the inbuilt processor 104 and the card 200 is concluded, and upon the camera control being set to a predetermined mode such as, for example, "view" (or its equivalent such as, for example, "play" or "display" or "transfer data") (503), the inbuilt processor 104 downloads from card 200 the first image file for display on the display 110 in accordance with normal operations. The central processor 202 then sends to the display interface 108 an index image file containing a first menu (504), with the navigation controls of controls 114 being able to be used in the normal manner for controlling the displayed menu. The first menu will contain a series of first items for determining the future performance of the camera 100. Each of the items of the first menu is a separate image within the index image file. The first menu items may include, for example:

1. transfer data
2. wireless detect
3. view image.

If at (503) the camera 100 is not set to the predetermined mode—"view" or its equivalent—the memory card 200 and the inbuilt processor 104 operate in the normal, known manner (505) under the operation of the inbuilt processor 104.

If the camera 100 is set to the predetermined mode, one of the displayed items must then be selected (506). As each item in the menu is a separate image, selecting one item in the menu list is selecting a separate image. Therefore, the controls 114 used must be such that the processor 104 can send an instruction to the control processor 202. There are normally two such instructions when in the view mode—"next" (send next image) and "delete" (delete this image). As "next" is required for the following operations, the "delete" function can be used. However, when the camera 100 is in the "view" mode AND if either "transfer data" or "wireless detect" is selected from the first menu items given above, the central processor 202 will interpret "delete" as "select". When the "send first image" instruction is sent by the processor 104 and is received by memory card control processor 202 (504), the central processor 202 recognizes that the camera 100 is in the "view" mode as this is the only time such an instruction is received.

As each of the first menu items is a separate image, by using "delete" not only is an instruction sent from processor 104 to central process 202, but the instruction contains an identifier of the image to enable the central processor 202 to know which image is to be deleted.

The central process 202 receives the instruction and, after confirming that the predetermined mode has been selected AND that the image selected is either (1) or (2) from the image index file, the central processor 202 treats the "delete" instruction as "select".

The central processor 202 will then take the necessary action depending on whether first menu item 1 or first menu item 2 was selected.

A query is raised (509) to determine if the first menu item selected is for wireless transfer. If not, it must be item 3. If item 3 is selected in the normal manner using controls 114 (507), the central processor 202 will treat the instruction in the normal manner and send the first image file from the storage module 206 (508) and the camera 100 and memory card 200 will continue to operate in the normal manner (505). If at (509) the first menu item selected is for wireless transfer, it could be item 1 or item 2. So a second query is raised (510) to determine if item 1 or item 2 was selected.

If at 510 item 2 was selected, the central processor 202 will activate the wireless module 204 (511) and a search will be undertaken for potential wireless networks to which the card 200 can be connected (512). This will be in the normal manner. Once all potential wireless networks are detected (513) they are displayed on the display 110 (514) and the controls 114 are used to select the desired wireless network (515). Upon the desired wireless network being selected a second index image file is downloaded from the central processor 202 to the display 110 (516). The second index image file contains a second menu list (517). The second index image file may be the same is the first index image file, or may be different. Each of the second menu list is also a separate image and has its own identifier.

The second menu list may be the same as the first menu list, or may be different. The second menu list may include items such as, for example:
1. transfer data
2. wireless detect
3. view image If at 510 item 1 is selected from the first menu list, the central processor 202 will determine if a wireless network has previously been selected (521). If not, it will revert to item 2 (510) and commence the search for potential wireless networks, as is described above. If a wireless network has previously been selected, the central processor 202 sequentially obtains the image data for the various image files (522) and, using the wireless module 204, uploads the image data to the selected, pre-determined web site (523). Upon uploading completing, a "completion" message may be displayed on display 110 (524) then the process ends (525).

If item 1 is selected from the second menu list at (518) and as the pre-determined web site is known and the network has just been selected, the central processor 202 will commence to download all the image files from the storage module 206 and transfer them to the wireless module 204 for wireless uploading of the image data to a pre-determined web site. If there is more than one pre-determined web site, the central processor 202 will send a list of the pre-determined web sites for display on the display 110 and, after one has been selected in the normal manner, will use the selected, pre-determined web site as that to which the image data is to be sent. The list of pre-determined web sites may be by their URL, or by a previously-entered abbreviated name and may include an email account at a web site.

The entry of the pre-determined web site is by operatively connecting the memory card 200 to a computer (not shown). The computer will upload the necessary interface from the central processor 202 and the computer will be used to enter the URL of the desired web site or web sites, or the email account, which is then stored in the storage module 206 of the memory card 200.

As such, when the camera 100 has been used to capture images that are stored in the storage module 206 of the memory card 200 in the normal manner, upon the camera controls 114 being set to the predetermined mode such as view, the procedure described above will commence. When in the camera 100 is in the predetermined mode, the central processor 202 and the wireless module 204 will then operate to send the image data to the selected, pre-determined web site over the Internet 300 so the images can be stored in the storage 402 of the server/PC or other computer 400. This may be done at a convenient time such as, for example, overnight when the camera 100 would normally not be in use.

If desired or required, when the uploading of all the image data is completed, the central processor 202 may compress or downsize the image data as stored in the storage module 206. Compression may be by any known and/or suitable compression application. Downsizing may be to downsize the images to, for example, thumbnail size. Compression and/or reduction are used to reduce the amount of memory in storage module 206 that is required to store the image data. Any compressed and/or reduced images will be noted and not resent to the pre-selected web site. Furthermore, any images that are sent to the pre-selected web site may be flagged as having been sent, and may not be resent in the future. However, the central processor may send a prompt to the display asking if old images are to be sent again, or only new, and previously unsent, images. Appropriate action will be taken by central processor 202 after the selection is made in the normal manner.

As can be seen, the memory card 200 will be able to connect to the host device 100 without any driver installation or modification of the software running on the host device 100 and is thus "plug-and-play".

The memory card 200 may include a digital rights management module for copyright protection of content downloaded to the memory card 200 storage module 206.

Whilst the foregoing description has described exemplary embodiments, it will be understood by those skilled in the technology concerned that many variations in details of design, construction and/or operation may be made without departing from the present invention.

The invention claimed is:

1. A memory card configured for use in an electronic apparatus having an inbuilt processor incapable of independently exporting digital data externally of the electronic apparatus, the digital data being captured by the electronic apparatus, the memory card comprising:
   a storage module for storing the digital data captured by the electronic apparatus;
   a wireless module for wirelessly exporting the stored digital data to a wireless network location;
   a central processor configured to control the export of the digital data from the electronic apparatus, the central processor being configured to send a first index image file to the inbuilt processor for display of the first index image file on a screen of the electronic apparatus, the first image index file comprising a plurality of first menu items, each of the plurality of first menu items comprising an image,
   wherein one of the plurality of first menu items is operable to be selected using a control of the electronic apparatus, to control the inbuilt processor of the electronic apparatus to instruct the central processor of the memory card to export the stored digital data wirelessly to the wireless network location through the wireless module.

2. A memory card as claimed in claim 1, wherein a first menu item selected determines if the inbuilt processor is to be used to process the digital data, or if the central processor and the wireless module are to be used to wirelessly export the digital data from the memory card.

3. A memory card as claimed in claim 1, wherein the memory card is physically and operably engaged in and with the electronic apparatus.

4. A memory card as claimed in claim 1, wherein the central processor is configured to send the first index image file to the inbuilt processor only when the electronic apparatus is in a predefined mode.

5. A memory card as claimed in claim 1, wherein the digital data is selected from the group consisting of: image data, audio data, image and audio data, video data, and audio and video data.

6. A memory card as claimed in claim 1, wherein the memory card comprises at least one address to which the central processor and the wireless interface are to send the digital data.

7. A memory card as claimed in claim 1, wherein the electronic apparatus is selected from the group consisting of: a digital camera, a digital video camera, a digital voice recorder, and a digital diary.

8. A memory card as claimed in claim 1, wherein another one of the plurality of first menu items is operable to be selected using a control of the electronic apparatus, to control the inbuilt processor of the electronic apparatus to instruct the central processor of the memory card to activate the wireless module to search for at least one wireless network.

9. A method for exporting data from an apparatus having an inbuilt processor incapable of independently exporting digital data externally of the apparatus, the method comprising:
sending a first index image file to the apparatus from a memory card installed in and operatively connected to the apparatus, the memory card having a central processor, a storage module and a wireless module, the first index image file comprising a plurality of first menu items with each of the first menu items comprising an image, the storage module having stored therein digital data;
using a control of the apparatus to select one menu item from the first menu items;
the one menu item selected for controlling the inbuilt processor of the apparatus to accordingly instruct the central processor of the memory card as to whether the inbuilt processor is to be used to process the digital data, or if the central processor and the wireless module are to be used to wirelessly export the digital data from the memory card.

10. A method as claimed in claim 9, further including:
capturing digital data using the apparatus and storing the digital data in the memory card.

11. A method as claimed in claim 9, wherein the memory card physically and operatively engages in and with the apparatus.

12. A method as claimed in claim 9, further comprising the step of selecting a predefined mode of the apparatus.

13. A method as claimed in claim 12, wherein the control of the apparatus is able to be used to control the central processor only when the apparatus is in the predefined mode.

14. A method as claimed in claim 13, wherein the exporting of the digital data can take place only when the apparatus is in the predefined mode.

15. A method as claimed in claim 12, wherein when the apparatus is in the predefined mode and the one menu item is relevant for the wireless export of the digital data from the memory card, the central processor treats the instruction as "select."

16. A method as claims in claim 15, wherein the instruction is "delete."

17. A method as claimed in claim 9, wherein the first index image file is displayed on a screen of the apparatus.

18. A method as claimed in claim 9, wherein the digital data is selected from the group consisting of: image data, audio data, image and audio data, video data, and audio and video data.

19. A method as claimed in claim 9, wherein the digital data is exported to at least one Internet address stored in the storage module.

20. A method as claimed in claim 9, wherein the apparatus is selected from the group consisting of: a digital camera, a digital video camera, a digital voice recorder, and a digital diary.

21. A method as claimed in claim 9, wherein upon the control being used to select the one menu item of the first menu items, the inbuilt processor sends an instruction to the central processor, the instruction containing an identifier of the one menu items.

22. A method as claimed in claim 9, wherein another one of the plurality of first menu items is selected for controlling the inbuilt processor of the apparatus to accordingly instruct the central processor of the memory card to activate the wireless module to search for at least one wireless network.

* * * * *